United States Patent
Kyuto

(10) Patent No.: US 12,043,090 B2
(45) Date of Patent: Jul. 23, 2024

(54) REFRIGERATION CYCLE DEVICE

(71) Applicant: DENSO CORPORATION, Kariya (JP)

(72) Inventor: Tatsurou Kyuto, Kariya (JP)

(73) Assignee: DENSO CORPORATION, Kariya (JP)

( * ) Notice: Subject to any disclaimer, the term of this patent is extended or adjusted under 35 U.S.C. 154(b) by 362 days.

(21) Appl. No.: 17/509,684

(22) Filed: Oct. 25, 2021

(65) Prior Publication Data

US 2022/0041038 A1 Feb. 10, 2022

Related U.S. Application Data

(63) Continuation of application No. PCT/JP2020/020055, filed on May 21, 2020.

(30) Foreign Application Priority Data

Jun. 3, 2019 (JP) ................................. 2019-103811

(51) Int. Cl.
| | |
|---|---|
| *B60H 1/32* | (2006.01) |
| *B60H 1/00* | (2006.01) |
| *F25B 1/00* | (2006.01) |
| *F25B 6/04* | (2006.01) |
| *F25B 39/00* | (2006.01) |

(Continued)

(52) U.S. Cl.
CPC ....... *B60H 1/3228* (2019.05); *B60H 1/00328* (2013.01); *B60H 1/00485* (2013.01); *B60H 1/00899* (2013.01); *B60H 1/00921* (2013.01); *B60H 1/3227* (2013.01); *F25B 1/00* (2013.01); *F25B 6/04* (2013.01); *F25B 39/00* (2013.01); *F25B 39/04* (2013.01); *F25B 41/00* (2013.01);

(Continued)

(58) Field of Classification Search
CPC .............. B60H 1/3228; B60H 1/00328; B60H 1/00485; B60H 1/00899; B60H 1/00921; B60H 1/3227; B60H 1/00807; F25B 1/00; F25B 6/04; F25B 39/00; F25B 39/04; F25B 41/00; F25B 41/40; F28F 9/02
See application file for complete search history.

(56) References Cited

U.S. PATENT DOCUMENTS

| | | | | |
|---|---|---|---|---|
| 4,483,156 | A | * 11/1984 | Oudenhoven | ........... F25B 39/00 62/324.1 |
| 5,101,640 | A | 4/1992 | Fukushima et al. | |

(Continued)

FOREIGN PATENT DOCUMENTS

| | | |
|---|---|---|
| DE | 102005017974 A1 | 11/2006 |
| DE | 112017003078 T5 * | 2/2019 ......... B60H 1/00335 |

(Continued)

*Primary Examiner* — Ljiljana V. Ciric
(74) *Attorney, Agent, or Firm* — Harness, Dickey & Pierce, P.L.C.

(57) ABSTRACT

An outdoor heat exchanger is installed in a refrigerant circuit and has a heat exchange core portion providing refrigerant flow paths different in a cooling operation and a heating operation. A flow path switching device switches the flow path of the refrigerant in the heat exchange core portion of the outdoor heat exchanger between a cooling mode flow path during the cooling operation and a heating mode flow path during the heating operation. The refrigerant flows down in one direction in the heating mode flow path. The refrigerant flows in one direction and then flows down in an opposite direction in the cooling mode flow path.

7 Claims, 5 Drawing Sheets

(51) Int. Cl.
*F25B 39/04* (2006.01)
*F25B 41/00* (2021.01)
*F25B 41/40* (2021.01)
*F28F 9/02* (2006.01)

(52) U.S. Cl.
CPC ............ *F28F 9/02* (2013.01); *B60H 1/00807* (2013.01); *F25B 41/40* (2021.01)

(56) References Cited

U.S. PATENT DOCUMENTS

| | | | | |
|---|---|---|---|---|
| 5,826,649 | A * | 10/1998 | Chapp | F28F 9/0243 165/110 |
| 8,235,101 | B2 * | 8/2012 | Taras | F28F 27/02 62/238.7 |
| 8,347,645 | B1 * | 1/2013 | Miller | H01M 8/04231 62/238.7 |
| 9,499,026 | B2 * | 11/2016 | Brodie | B60H 1/00907 |
| 9,862,251 | B2 * | 1/2018 | Brodie | B60H 1/00335 |
| 10,759,257 | B2 * | 9/2020 | Katoh | F25B 5/04 |
| 10,760,832 | B2 * | 9/2020 | Hatomura | F25B 6/04 |
| 10,899,196 | B2 * | 1/2021 | Kawakubo | B60H 1/32 |
| 11,299,014 | B2 * | 4/2022 | Kato | B60H 1/32284 |
| 11,383,583 | B2 * | 7/2022 | Kozasa | H01M 10/625 |
| 11,498,391 | B2 * | 11/2022 | Shiratori | B60H 1/03 |
| 11,833,887 | B2 * | 12/2023 | Kawano | B60H 1/00278 |
| 2008/0141708 | A1 * | 6/2008 | Obosu | B23K 1/0012 165/151 |
| 2008/0296005 | A1 | 12/2008 | Taras et al. | |
| 2011/0174015 | A1 * | 7/2011 | Nagano | F25B 41/00 62/515 |
| 2019/0118615 | A1 * | 4/2019 | Kawakubo | F24F 1/14 |
| 2020/0101819 | A1 | 4/2020 | Yamada et al. | |
| 2022/0032732 | A1 * | 2/2022 | Makihara | H01M 10/6562 |

FOREIGN PATENT DOCUMENTS

| | | | | |
|---|---|---|---|---|
| JP | 2008528946 | A | 7/2008 | |
| JP | 2009270781 | A | 11/2009 | |
| JP | 2017227367 | A * | 12/2017 | ......... B60H 1/00335 |
| WO | WO-2019003694 | A1 | 1/2019 | |
| WO | WO-2019026481 | A1 * | 2/2019 | ............... F25B 1/00 |

* cited by examiner

→ HOP: HEATING OPERATION
--→ ACOP: COOLING OPERATION

US 12,043,090 B2

REFRIGERATION CYCLE DEVICE

CROSS REFERENCE TO RELATED APPLICATIONS

The present application is a continuation application of International Patent Application No. PCT/JP2020/020055 filed on May 21, 2020, which designated the U.S. and claims the benefit of priority from Japanese Patent Application No. 2019-103811 filed on Jun. 3, 2019, the entire disclosure of the above application is incorporated herein by reference.

TECHNICAL FIELD

Disclosure in this specification relates to a refrigeration cycle device.

BACKGROUND

Refrigeration cycle devices are commonly used to control a temperature of an object in both a cooling purpose and a heating purpose. It is required to improve both a cooling performance and a heating performance. In the above aspects, or in other aspects not mentioned, there is a need for further improvements in a refrigeration cycle device.

SUMMARY

A refrigeration cycle device disclosed herein is refrigeration cycle device, comprising: a refrigerant circuit through which a refrigerant circulates; a cooling heat exchanger which is installed in the refrigerant circuit, and performs a heat exchange between the refrigerant flowing inside and an object to be cooled during a cooling operation for cooling the object to be cooled; a heating heat exchanger which is installed in the refrigerant circuit and performs a heat exchange between the refrigerant flowing inside and an object to be heated during a heating operation for heating the object to be heated; a variable flow path heat exchanger which is installed in the refrigerant circuit, and has a heat exchange core portion providing refrigerant flow paths different in the cooling operation and the heating operation; and a flow path switching device which switches a flow path of the refrigerant in the heat exchange core portion of the variable flow path heat exchanger between the cooling mode flow path during the cooling operation and the heating mode flow path during the heating operation, wherein the heating mode flow path is a flow path through which the refrigerant flows down in one direction in the heat exchange core portion, and wherein the cooling mode flow path is a flow path through which the refrigerant flows in one direction and then flows down in the opposite direction in the heat exchange core portion.

According to this refrigeration cycle device, a cooling capacity can be improved by improving a distribution of the refrigerant in the heat exchange core portion during the cooling operation. Further, during the heating operation, a heating capacity can be improved by increasing a refrigerant flow rate due to a low pressure loss. From the above, it is possible to provide a refrigeration cycle device capable of achieving both the heating performance and the cooling performance.

BRIEF DESCRIPTION OF DRAWINGS

The disclosure is further described with reference to the accompanying drawings in which.

DETAILED DESCRIPTION

Figure 1:
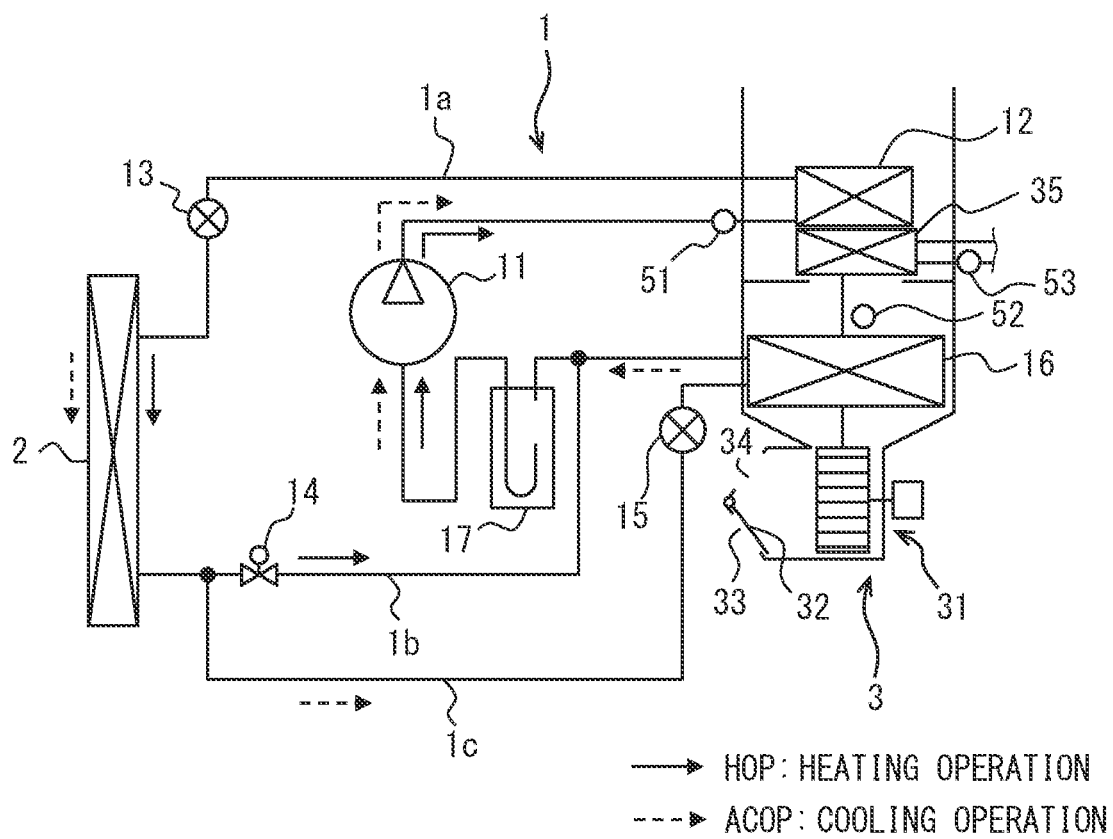
FIG. 1 is a block diagram of a refrigeration cycle.

Hereinafter, embodiments for implementing the present disclosure will be described referring to drawings. In each embodiment, portions corresponding to the elements described in the preceding embodiments are denoted by the same reference numerals, and redundant explanation may be omitted. When only a part of the configuration is described in each form, the other forms described above can be applied to the other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

The first embodiment is described with reference to FIGS. 1 to 4. The first embodiment shows an example of a refrigeration cycle device capable of achieving the object of disclosure in the specification. A refrigeration cycle device that can achieve the object disclosed in the specification can cool or heat a fluid or an object that exchanges heat with a refrigerant in a heat exchanger. The fluid or object cooled in a cooling heat exchanger is a temperature-controlled cooling object. The fluid or object heated in a heating heat exchanger is a temperature-controlled object to be heated. The object to be cooled and the object to be heated are liquids such as air and water, or solid objects, and the like. The object to be cooled and the object to be heated can also be referred to as a temperature-controlled object whose temperature is controlled. In the first embodiment, an example in which a refrigeration cycle device is used as a vehicle air conditioner in which the temperature-controlled object is air is described.

FIG. 1 shows a refrigeration cycle and an air conditioning unit 3 for a vehicle. In FIG. 1, a solid arrow indicates a refrigerant flow in the refrigeration cycle during a heating operation (HOP). The heating operation is an example of a heating operation for heating an object to be heated. In FIG. 1, a dashed arrow indicates a refrigerant flow in the refrigeration cycle during a cooling operation (ACOP) to cool an object to be cooled. The cooling operation is an example of a cooling operation for cooling the object to be cooled.

The vehicle air conditioner includes a heat pump type refrigeration cycle device 1 and an air conditioner unit 3. The vehicle air-conditioning device performs air-conditioning operation within a vehicle interior, and can be used for, for example, a hybrid vehicle, an electric vehicle, a fuel cell vehicle, or the like.

The air conditioning unit 3 includes an air conditioning case having an air ventilation path inside. The air conditioning unit 3 is provided on a back side of an instrument panel in front of the vehicle interior. An air-conditioning case is provided with an outside air intake 33 and an inside air intake 34, which are air intakes, on one side, and an air outlet on the other side from which the conditioned air blown into the vehicle interior flows out. The outlet includes at least a foot outlet, a face outlet, and a defrost outlet. These openings are connected to the vehicle interior space via outlet ducts, and are opened and closed according to outlet modes by outlet switching doors.

The outside air intake 33 and the inside air intake 34 can be freely opened and closed in accordance with air intake modes by inside/outside air switching door 32. The air conditioning unit 3 includes an inside/outside air switching box having the inside/outside air switching door 32 on one side, and a blower 31 whose suction portion communicates with the outside air intake 33 and the inside air intake 34.

For example, during heating in winter or the like, the outside air with low humidity is introduced into the air conditioning case from the outside air intake 33 by the outside air intake mode, and the conditioned air is blown out to an inner surface of the front window. This blowing wind can enhance the anti-fog effect of the front window. Further, a heating load can be reduced by introducing a high-temperature inside air from the inside air intake 34 in the inside air mode and blowing out the conditioned air toward feet of an occupant.

The blower 31 has a centrifugal multi-blade fan and a motor for driving the centrifugal multi-blade fan. The centrifugal multi-blade fan is surrounded by a scroll casing. Further, the air conditioning case is composed of a plurality of case members, and the material thereof is a resin molded product such as polypropylene.

The blower portion of the blower 31 communicates with a ventilation path provided in the air conditioning case so as to extend in a centrifugal direction of the centrifugal multi-blade fan. An evaporator 16, a heater core 35, and a condenser 12 are arranged on the downstream side of the ventilation path on a downstream side of a blown air from the blower 31.

The evaporator 16 is installed in the air conditioning case so as to cross an entire passage immediately after the blower 31. The evaporator 16 is provided so that all the air blown from the blower 31 can pass through. The evaporator 16 is a cooling heat exchanger that cools the blown air in the air conditioning case, which is an object to be cooled, by a heat absorbing action of the refrigerant flowing inside during the cooling operation. A post-evaporator temperature sensor 52 which detects a temperature TE of the air cooled by the evaporator 16 is provided at an outlet portion of the evaporator 16 or a downstream portion of the evaporator 16. The post-evaporator temperature sensor 52 outputs a detected signal to the control device 4.

A heating means using exhaust heat is provided in the ventilation passage in the air conditioning case. The heater core 35 is an example of the heating means using exhaust heat, and is a heat exchanger having a heat exchange core portion for heat exchange. This heat exchange core portion is included in a part of a hot water circulation circuit due to a configuration in which the heat exchange core portion is connected to an engine or battery which is a heat generation source by piping. Circulating water exists in a circulation circuit, and an amount of heat generated from the heat generation source is transferred to the heat exchange section by the circulating water. The heater core 35 is arranged on the downstream side of the evaporator 16 so that the heat exchange core portion is located in the ventilation path. The heater core 35 heats a surrounding air by dissipating heat from the cooling water of a vehicle traveling engine flowing inside during the heating operation.

A temperature of a hot water flowing inside the heater core 35 is detected by a water temperature sensor 53 and input to the control device 4. The control device 4 calculates a heating amount given to the blown air by the heating means using exhaust heat by using a detection temperature Tw of a water temperature sensor 53. The control device 4 can calculate a heating capacity of the air conditioner using the detected temperature Tw, and can determine whether or not a calculated heating capacity satisfies a blowing out air temperature.

The condenser 12 is arranged on the downstream side of the heater core 35 so that a heat exchange core portion is located in the ventilation path. The condenser 12 is a heating heat exchanger that heats the blown air in the air conditioning case, which is the object to be heated, by a heat dissipation action of the refrigerant flowing inside during the heating operation.

The refrigeration cycle device 1 is an example of a device capable of cooling and heating by the evaporator 16 and the condenser 12 by utilizing a change of state of the refrigerant flowing through the refrigerant circuit. Components of the refrigeration cycle device 1 are installed in a refrigerant circuit formed by piping. The refrigeration cycle device 1 includes a compressor 11, a condenser 12, an expansion valve 13, an outdoor heat exchanger 2, a solenoid valve 14, an expansion valve 15, an evaporator 16, and an accumulator 17. The refrigerant circuit includes a high-pressure side passage 1*a* and a low-pressure side passage including a heating passage 1*b* and a cooling passage 1*c*. The high-pressure side passage 1*a* is a passage which connects an outlet portion of the compressor 11 and an upstream portion of the outdoor heat exchanger 2. The heating passage 1*b* is a passage which connects a downstream portion of the outdoor heat exchanger 2 and an upstream portion of the accumulator 17. The cooling passage 1*c* is a passage which connects a downstream portion of the outdoor heat exchanger 2 and the evaporator 16.

At an outlet of the compressor 11, a discharge pressure sensor 51 is provided to detect a pressure of a high-pressure side refrigerant discharged by the compressor 11. The condenser 12 heats the blown air by exchanging heat between the refrigerant discharged from the compressor 11 and the blown air during the heating operation. The expansion valve 13 is a pressure reducing device which reduces a pressure of the refrigerant flowing out of the condenser 12 during the heating operation.

The outdoor heat exchanger 2 evaporates the refrigerant decompressed by the expansion valve 13 during the heating operation and absorbs heat from an outside air. The outdoor heat exchanger 2 is arranged outside the vehicle interior of the vehicle, and exchanges heat between an outside air forcibly blown by an outdoor fan and the refrigerant. The solenoid valve 14 is an on-off valve provided in the heating passage 1*b* and controls the flow of the refrigerant from the outdoor heat exchanger 2 to the compressor 11 in the heating passage 1b. The expansion valve 15 is a pressure reducing device provided in the cooling passage 1c to reduce a pressure of the refrigerant upstream of the evaporator 16 and downstream of the outdoor heat exchanger 2 during the cooling operation. The accumulator 17 separates the refrigerant before being sucked into the compressor 11 into gas and liquid so that the gaseous refrigerant is easily sucked into the compressor 11.

The control device 4 controls the solenoid valve 14 to an open state and controls the expansion valve 15 to a closed state during the heating operation. The refrigerant path during the heating operation is a path in which the refrigerant flows in an order of the compressor 11, the condenser 12, the expansion valve 13, the outdoor heat exchanger 2, the solenoid valve 14, the accumulator 17, and the compressor 11. The control device 4 controls the solenoid valve 14 to a closed state and controls the expansion valve 15 to an open state to reduce the pressure of the refrigerant during the cooling operation. The refrigerant path during the cooling operation is a path in which the refrigerant flows in an order of the compressor 11, the condenser 12, the expansion valve 13, the outdoor heat exchanger 2, the expansion valve 15, the evaporator 16, the accumulator 17, and the compressor 11.

The compressor 11 can perform a rotation speed control and an ON-OFF switching control. In the compressor 11, for example, an AC voltage whose frequency is adjusted by an inverter is applied to control a rotation speed of a motor. In this case, the inverter receives a DC power supply from a vehicle-mounted battery and is controlled by the control device 4.

The compressor 11 may be a variable displacement compressor capable of varying a compression capacity of the refrigerant. The compressor 11 is provided with a capacity control valve, which is a capacity control mechanism for changing a discharge capacity. The capacity control valve is an electromagnetically driven valve, for example, an on-off valve that can repeatedly open and close a refrigerant supply passage by a duty control. A valve opening time of the capacity control valve is controlled by supplying a current in a form of a duty signal consisting of two values, ON and OFF, as a capacity control signal by the control device 4. The capacity control valve is operated by the capacity control signal from the control device 4, and a control pressure Pc in a case of the compressor 11 is changed. When this control pressure Pc changes, a stroke of a piston or the like changes, and the capacity of the compressor 11 changes.

The duty signal is a signal of a pulse waveform current which repeats ON and OFF every short time. The ON and OFF of the signal correspond to the opening and closing of the capacity control valve. The capacity of the compressor 11 decreases when the capacity control valve is opened and increases when the capacity control valve is closed. That is, when it is necessary to reduce the capacity, a signal for lengthening a valve opening time is sent to increase the control pressure Pc, and when it is necessary to increase the capacity, a signal for shortening the valve opening time is sent to decrease Pc. By changing the duty ratio of the pulse signal in this way, the capacity of the compressor 11 can be changed linearly and freely controlled.

The vehicle air conditioning device includes a control device 4. The control device in this specification may also be referred to as an electronic control unit (ECU). The control unit or a control system is provided by (a) an algorithm as a plurality of logic called an if-then-else form, or (b) a learned model tuned by machine learning, e.g., an algorithm as a neural network.

The control device is provided by a control system including at least one computer. The control system may include multiple computers linked by a data communication device. The computer includes at least one processor (hardware processor) that is hardware. The hardware processor may be provided by (i), (ii), or (iii) below.

(i) The hardware processor may be at least one processor core that executes a program stored in at least one memory. In this case, the computer is provided with at least one memory and at least one processor core. The processor core is called a CPU: Central Processing Unit, a GPU: Graphics Processing Unit, a RISC-CPU, or the like. The memory is also called a storage medium. The memory is a non-transitory and tangible storage medium, which non-temporarily stores a program and/or data readable by the processor. The storage medium may be a semiconductor memory, a magnetic disk, an optical disk, or the like. The program may be distributed as a single unit or as a storage medium in which the program is stored.

(ii) The hardware processor may be a hardware logic circuit. In this case, the computer is provided by a digital circuit including a number of programmed logic units (gate circuits). The digital circuit is also called a logic circuit array, for example, ASIC: Application-Specific Integrated Circuit, FPGA: Field Programmable Gate Array, PGA: Programmable Gate Array, or CPLD: Complex Programmable Logic Device. The digital circuit may comprise a memory storing programs and/or data. The computer may be provided by an analog circuit. A computer may be provided by a combination of a digital circuit and an analog circuit.

(iii) The hardware processor may be a combination of the above (i) and the above (ii). (i) and (ii) are placed on different chips or on a common chip. In these cases, the part (ii) is also called an accelerator.

Figure 2:
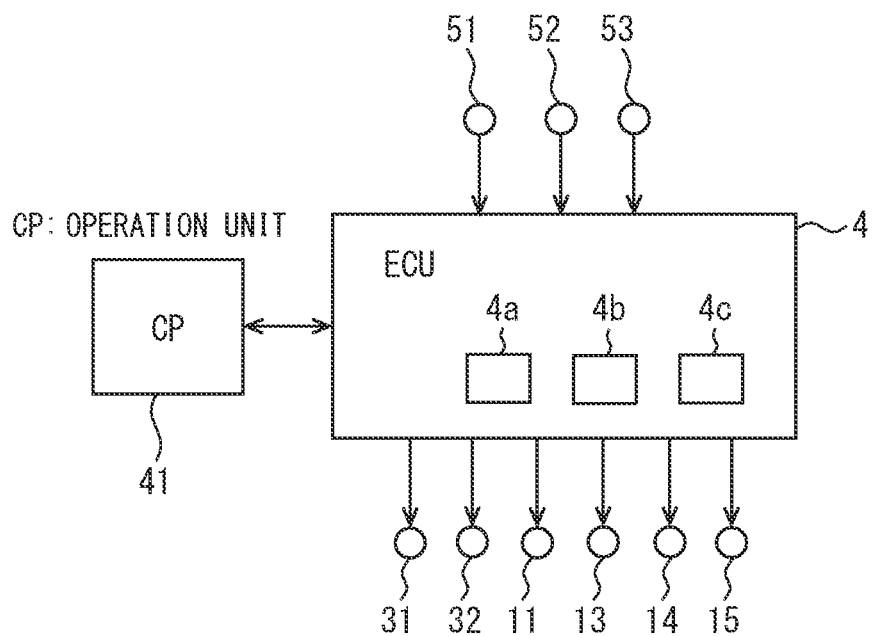
FIG. 2 is a control configuration diagram of a vehicle air-conditioner of a first embodiment.

The control device 4 acquires command information from the vehicle ECU, temperature information from various sensors, and input information transmitted by operating an operation unit 41. The control device 4 outputs control signals to various air-conditioning devices in the vehicle air-conditioning device based on the information. As shown in FIG. 2, detection signals of a group of sensors for air conditioning control such as the discharge pressure sensor 51, the post-evaporator temperature sensor 52, the water temperature sensor 53, an inside air sensor and an outside air sensor are inputted to the input unit of the control device 4. The inside air sensor 41 detects an inside air temperature Tr at an inside of the vehicle interior. The outside air sensor detects an outside air temperature TAM at an outside of the vehicle interior. The solar radiation sensor detects an amount of solar radiation TS emitted into the vehicle interior.

Operation signals from various operation units 41 provided on an operation panel near an instrument panel in a front part of the vehicle interior are input to an input unit of the control device 4. The operation unit 41 includes, for example, a power switch for a vehicle air conditioner, an automatic operation switch, an outlet mode changeover switch for switching the outlet modes, an air capacity setting switch, a temperature setting switch for setting a temperature in the vehicle interior, and the like. The control device 4 receives signals transmitted from the operation unit 41 and outputs them to the arithmetic processing unit 4b.

The control device 4 includes a device such as a microcontroller that operates according to a program as a main hardware element. The control device 4 includes at least an interface unit 4a for connecting the air conditioning devices and various sensors, an arithmetic processing unit 4b, and a storage unit 4c. The storage unit 4c is a non-transitory tangible storage medium which non-transitory stores a computer readable program. The arithmetic processing unit 4b is an arithmetic processing device, and performs determination processing and arithmetic processing according to a predetermined arithmetic program by using environmental information acquired from various sensors through the interface unit 4a and control characteristic maps and data stored in the storage unit 4c. The arithmetic processing unit 4b is an arithmetic execution unit and a determination processing execution unit in the control device 4. The interface unit 4a operates the air-conditioning devices based on a determination result and an arithmetic result by the arithmetic processing unit 4b. Therefore, the interface unit 4a is an input unit and a control output unit in the control device 4. The air-conditioning equipment to be operated includes the blower 31, the outdoor fan, the inside/outside air switching door 32, the blowout switching door, the compressor 11, the expansion valve 13, the solenoid valve 14, the expansion valve 15, and the like.

The arithmetic processing unit 4b executes each process such as calculation of a target outlet temperature TAO, blower voltage determination, intake mode determination, and outlet mode determination in an automatic air conditioning operation.

The target outlet temperature TAO can be calculated by using the following mathematical expression 1 stored in the storage unit 4c.

$$TAO = Kset \times Tset - Kr \times Tr - Kam \times Tam - Ks \times Ts + C \quad \text{(Expression 1)}$$

Here, Tset is a set temperature which is set by a temperature setting switch 43, Tr is an inside air temperature detected by an inside air sensor, Tam is an outside air temperature detected by an outside air sensor, and Ts is an amount of solar irradiance detected by a solar radiation sensor. Kset, Kr, Kam and Ks are gains, and C is a constant for correction applied to the whole.

The arithmetic processing unit 4b determines the blower voltage corresponding to the target outlet temperature TAO by using a map stored in the storage unit 4c. The arithmetic processing unit 4b determines the intake modes corresponding to the target outlet temperature TAO from a map stored in the storage unit 4c. For example, when the target outlet temperature TAO is high, the outside air intake mode is determined, and when the target outlet temperature TAO is low, the inside air circulation mode is determined. When one intake mode is set by the operation unit 41, the control device 4 determines set intake mode.

The arithmetic processing unit 4b determines the outlet mode corresponding to the target outlet temperature TAO from a map stored in the storage unit 4c. For example, when the target outlet temperature TAO is high, a foot mode is selected, and as the target outlet temperature TAO decreases, a bi-level mode and then a face mode are selected in this order. When one outlet mode is set by the operation unit 41, the control device 4 determines set outlet mode.

Figure 3:
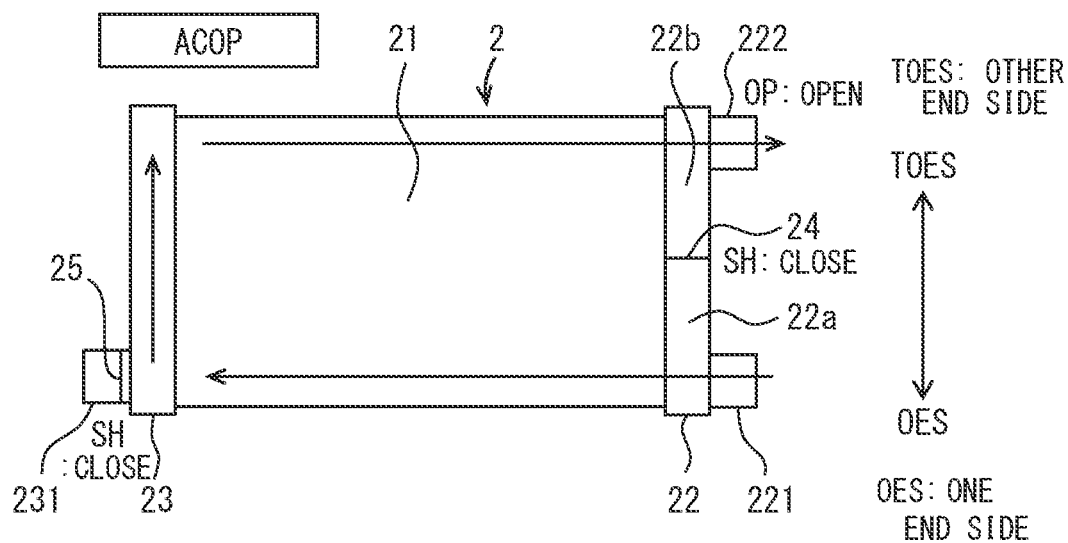
FIG. 3 is a schematic view showing a refrigerant flow during a cooling operation in a variable flow path heat exchanger of the first embodiment.
Figure 4:
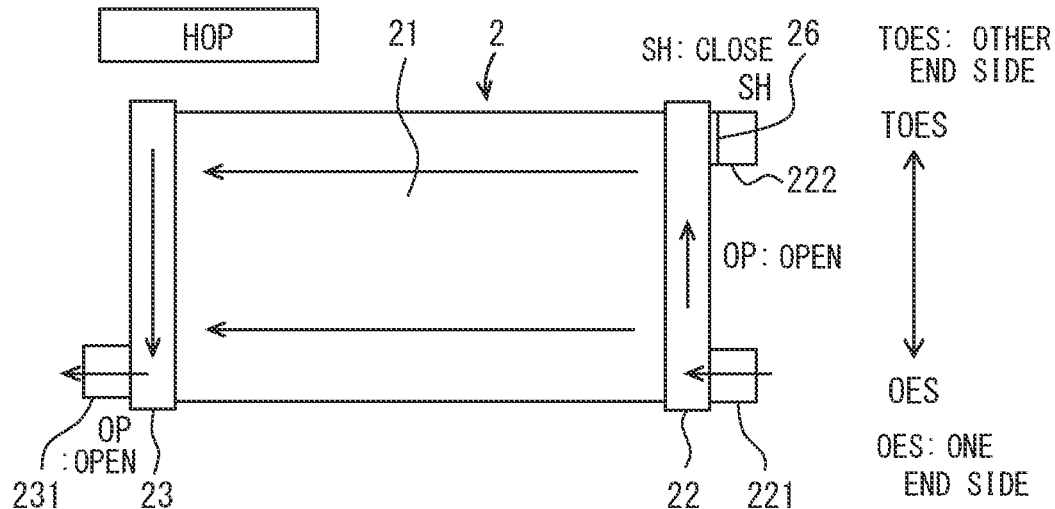
FIG. 4 is a schematic view showing a refrigerant flow during a heating operation in the variable flow path heat exchanger.

The outdoor heat exchanger 2 is described with reference to FIGS. 3 and 4. FIG. 3 shows a relationship between the refrigerant flow and the flow path switching device during the cooling operation of the outdoor heat exchanger 2. FIG. 4 shows a relationship between the refrigerant flow and the flow path switching device during the heating operation of the outdoor heat exchanger 2.

The outdoor heat exchanger 2 is a heat exchanger in which the flow path through which the refrigerant flows through the heat exchange core portion 21 during the cooling operation and the flow path through which the refrigerant flows through the heat exchange core portion 21 during the heating operation are different. The outdoor heat exchanger 2 is a variable flow path heat exchanger which switches between a cooling mode flow path during the cooling operation and a heating mode flow path during the heating operation. The refrigeration cycle device 1 includes a flow path switching device capable of switching the flow path in the heat exchange core portion 21 of the outdoor heat exchanger 2. The flow path switching device includes a plurality of valve portions capable of opening and closing a passage communicating with the heat exchange core portion 21 of the outdoor heat exchanger 2. The plurality of valve portions have functions of switching the flow path of the refrigerant in the heat exchange core portion 21 of the outdoor heat exchanger 2 between the cooling mode flow path during the cooling operation and the heating mode flow path during the heating operation.

The outdoor heat exchanger 2 includes a heat exchange core portion 21, a first tank portion 22, and a second tank portion 23. The heat exchange core portion 21 is a portion where the refrigerant flowing inside and air exchange heat. The heat exchange core portion 21 includes, for example, tubes through which a refrigerant flows, and fins provided to transfer heat with the tubes. Air passes around the tubes and fins so as to penetrate the heat exchange core portion 21, and dissipates heat to the refrigerant or absorbs heat from the refrigerant.

The first tank portion 22 and the second tank portion 23 are integrally provided at both ends of the heat exchange core portion 21. An inside of the first tank portion 22 and an inside of the second tank portion 23 communicate with each other via the tubes of the heat exchange core portion 21. The first tank portion 22 and the second tank portion 23 are separated from each other in a direction orthogonal to a longitudinal direction of the tank portion. The orthogonal direction is an arrangement direction of the first tank portion 22 and the second tank portion 23, and is also the longitudinal direction or a lateral direction of the heat exchange core portion 21. The longitudinal direction of the tank portion is the lateral direction or a vertical direction of the heat exchange core portion 21.

The first tank portion 22 is provided with an inflow side connection portion 221 and an outflow side connection portion 222. The inflow side connection portion 221 is connected to the high pressure side passage 1a in the refrigerant circuit. The high-pressure side passage 1a communicates with the heat exchange core portion 21 via an inside of the inflow side connecting portion 221 and the first tank portion 22. The outflow side connection portion 222 is connected to the cooling passage 1c in the refrigerant circuit. The cooling passage 1c communicates with the heat exchange core portion 21 via the outflow side connecting portion 222 and an inside of the first tank portion 22. The inflow side connecting portion 221 is provided on a one end side (OES) of the first tank portion 22 in the longitudinal direction. The outflow side connecting portion 222 is provided on the other end side (TOES) of the first tank portion 22 in the longitudinal direction. The inflow side connection portion 221 and the outflow side connection portion 222 are provided at both ends in the longitudinal direction in the first tank portion 22.

The second tank portion 23 is provided with an outflow side connecting portion 231. The outflow side connecting portion 231 is connected to the heating passage 1b in the refrigerant circuit. The heating passage 1b communicates with the heat exchange core portion 21 via the outflow side connecting portion 231 and an inside of the second tank portion 23. The outflow side connecting portion 231 is provided on one end side in the longitudinal direction of the second tank portion 23. The outflow side connection portion 231 is provided on the second tank portion 23 at a position opposite to the inflow side connection portion 221 with respect to the heat exchange core portion 21.

The refrigeration cycle device 1 includes a first valve 24, a second valve 25, and a third valve 26 which constitute a flow path switching device. The first valve 24 is a valve portion capable of dividing the inside of the first tank portion 22 into two. The first valve 24 is a valve portion which is operated to a closed state (SH) during the cooling operation shown in FIG. 3 to divide the inside of the first tank portion 22 into one end side chamber 22a and the other end side chamber 22b in the longitudinal direction. The first valve 24 is operated to an open state (OP) during the heating operation shown in FIG. 4 to communicate the one end side chamber 22a and the other end side chamber 22b.

The second valve 25 is a valve portion capable of opening and closing the passage in the outflow side connecting portion 231. The second valve 25 is operated to a closed state (SH) during the cooling operation shown in FIG. 3 to close a passage in an inside of the outflow side connecting portion 231 and to shut off between an inside of the second tank portion 23 and the heating passage 1b. The second valve 25 is operated to an open state (OP) during the heating operation shown in FIG. 4 to communicate the inside of the second tank portion 23 with the heating passage 1b.

The third valve 26 is a valve portion capable of opening and closing the passage in the outflow side connecting portion 222. The third valve 26 is operated to an open state (OP) during the cooling operation shown in FIG. 3 to communicate the inside of the first tank portion 22 with the cooling passage 1c. The third valve 26 is operated to a closed state (SH) during the heating operation shown in FIG. 4 to shuts off the inside of the first tank portion 22 and the cooling passage 1c.

The first valve 24, the second valve 25, and the third valve 26 are pressure-operated valve portions which becomes the open state or the close state depending on magnitude of pressure. The first valve 24, the second valve 25, and the third valve 26 do not have a configuration in which the operation is controlled by a control signal, but have a configuration in which the operation is mechanically moved by pressure. The first valve 24, the second valve 25, and the third valve 26 may be a valve portion which has a switch and automatically switches on and off of the switch according to pressure to switch between the open state and the closed state.

The first valve 24 is configured to be operated to become the closed state when a pressure in the first tank portion 22 increases higher than a first pressure threshold value. The second valve 25 is configured to be operated to become the closed state when the pressure in the second tank portion 23 or the outflow side connection portion 231 increases higher than the first pressure threshold value. The third valve 26 is configured to become the open state when the pressure in the first tank portion 22 increases higher than the first pressure threshold value. The refrigeration cycle device 1 becomes a high pressure state in which a detected value of the discharge pressure sensor 51 is 1.0 MPa or more during the cooling operation in which the air is cooled by the evaporator 16. The first pressure threshold value is set to a value suitable for the state in which the refrigeration cycle device 1 is operated at high pressure during the cooling operation. The first pressure threshold value is set to a value slightly lower than a pressure in the first tank portion 22, a pressure in the second tank portion 23, and a pressure in the outflow side connection portion 231 during the cooling operation. With this configuration, the first valve 24, the second valve 25, and the third valve 26 is operated in the closed state, the closed state, and the open state, respectively, during the cooling operation.

During the cooling operation, the refrigerant floes in an order of the high-pressure side passage 1a, an inside of the inflow side connection portion 221, the one end side chamber 22a, an one end side flow path of the heat exchange core portion 21, an inside of the second tank portion 23, the other end side flow path of the heat exchange core portion 21, the other end side chamber 22b, and the cooling passage 1c. The flow path during the cooling operation in the outdoor heat exchanger 2 is the cooling mode flow path. The one end side flow path of the heat exchange core portion 21 and the other end side flow path of the heat exchange core portion 21 correspond to half of the entire area of the heat exchange core portion 21, respectively. This cooling mode flow path includes a U-turn-shaped flow path in which the refrigerant flows in one direction and then flows down in the opposite direction in the heat exchange core portion 21. Providing a U-turn-shaped refrigerant flow path in the outdoor heat exchanger 2 results in a good refrigerant distribution during cooling and contributes to an improvement in the cooling capacity, but causes a pressure loss during heating and a decrease in the heating capacity. Therefore, in order to contribute to the improvement of the heating capacity, the refrigerant flow path in the outdoor heat exchanger 2 is set as follows during heating.

The first valve 24 is configured to become the open state when the pressure in the first tank portion 22 decreases lower than a second pressure threshold value. The second pressure threshold value is set to a value lower than the first pressure threshold value. The second valve 25 is configured to become the open state when the pressure in the second tank portion 23 or the outflow side connection portion 231 decreases lower than the second pressure threshold value. The third valve 26 is configured to be operated to become the closed state when a pressure in the first tank portion 22 decreases lower than the second pressure threshold value. The refrigeration cycle device 1 becomes a low pressure state in which the detected value of the discharge pressure sensor 51 is 0.5 MPa or less during the heating operation in which the air is heated by the condenser 12. The second pressure threshold value is set to a value slightly higher than a pressure in the first tank portion 22, a pressure in the second tank portion 23, and a pressure in the outflow side connection portion 231 during the heating operation. With this configuration, the first valve 24, the second valve 25, and the third valve 26 are operated in the open state, the open state, and the closed state, respectively, during the heating operation.

During the heating operation, the refrigerant flows in an order of the high-pressure side passage 1a, an inside of the inflow side connection portion 221, the first tank portion 22, an entire area of the heat exchange core portion 21, the second tank portion 23, and the heating passage 1b. The flow path during the heating operation in the outdoor heat exchanger 2 is the heating mode flow path. This heating mode flow path is an all path flow path in which the refrigerant flows down in one direction from the first tank portion 22 to the second tank portion 23 in the heat exchange core portion 21.

The first valve 24, the second valve 25, and the third valve 26 may be temperature-operated valve portions which become the open state or the closed state depending on the temperature. In this case, the first valve 24, the second valve 25, and the third valve 26 have a configuration mechanically movable depending on the temperature. In the case of this valve portion, valves are operated when the ambient temperature is higher than a predetermined first temperature threshold during the cooling operation, and valves are operated when the ambient temperature is lower than a predetermined second temperature threshold during the cooling operation. The second temperature threshold is set to a temperature lower than the first temperature threshold. The ambient temperature may be an ambient temperature of each valve, or a temperature of the heated object or the cooled object.

Actions and effects brought about by the refrigeration cycle device 1 of the first embodiment are described. The refrigeration cycle device 1 includes the refrigerant circuit, the cooling heat exchanger, the heating heat exchanger, the variable flow path heat exchanger, and the flow path switching device. The cooling heat exchanger is installed in the refrigerant circuit, and perform a heat exchange between the refrigerant flowing inside and the object to be cooled during the cooling operation for cooling the object to be cooled. The heating heat exchanger is installed in the refrigerant circuit, and perform a heat exchange between the refrigerant flowing inside and the object to be heated during the heating operation for heating the object to be heated. The variable flow path heat exchanger is a heat exchanger which is installed in the refrigerant circuit and has the heat exchange core portion providing refrigerant flow paths different in the cooling operation and the heating operation. The flow path switching device is a device which switches the flow path of the refrigerant in the heat exchange core portion of the variable flow path heat exchanger between the cooling mode flow path during the cooling operation and the heating mode flow path during the heating operation. The heating mode flow path is a flow path through which the refrigerant flows down in one direction in the heat exchange core portion of the variable flow path heat exchanger. The cooling mode flow path includes a flow path in which the refrigerant flows in one direction and then flows down in the opposite direction in the heat exchange core portion of the variable flow path heat exchanger.

According to this refrigeration cycle device 1, during the cooling operation, the cooling mode flow path including the flow path in which the refrigerant flows in one direction and then flows down in the opposite direction in the heat exchange core portion is performed. Further, during the heating operation, the heating mode flow path in which the refrigerant flows down in one direction in the heat exchange core portion is performed. By such flow path switching, it is possible to perform a heat exchange in a wide range of the heat exchange core portion during the cooling operation, so that an amount of heat exchange increases. Since the refrigerant flows down the heat exchange core portion in one direction during the heating operation, the flow path resistance can be reduced, the pressure loss can be reduced, and the refrigerant flow rate can be improved. Therefore, the cooling capacity is improved by improving the refrigerant distribution during the cooling operation, and the heating capacity is improved by improving the refrigerant flow rate during the heating operation. Since the refrigeration cycle device 1 can implement a flow path configuration that enhances the heat exchange performance in both the cooling operation and the heating operation, it is possible to achieve both the heating performance and the cooling performance.

When the refrigerating cycle device 1 is applied to a vehicle air conditioner, both heating performance and cooling performance can be achieved, so that a decrease in a coefficient of performance of the refrigerator can be suppressed, and a decrease in fuel consumption or electricity cost can be suppressed. Further, since the refrigeration cycle device 1 contributes to reduce the output capacity of the compressor and a surface area of the heat exchange core portion, it is possible to improve an ability of product installation and to suppress a product cost.

The variable flow path heat exchanger includes the heat exchange core portion 21, and both the first tank portion 22 and the second tank portion 23 which communicate with the heat exchange core portion 21 and are provided at both ends of the heat exchange core portion. The refrigerant circuit includes the cooling passage 1c and the heating passage 1b. The cooling passage 1c is a passage connecting a passage communicating with the suction portion of the compressor 11 and the first tank portion 22 via the cooling heat exchanger. The heating passage 1b is a passage connecting a passage communicating with the suction portion of the compressor 11 and the second tank portion 23 without passing through the cooling heat exchanger. The flow path switching device includes the first valve 124, the second valve 125, and the third valve 126. The first valve 124 opens and closes a passage at an inside of the first tank portion 22. The second valve 125 opens and closes to provide a communicating state and a shutoff state between an inside of the second tank portion 23 and the heating passage 1b. The third valve 126 opens and closes to provide a communicating state and a shutoff state between an inside of the first tank portion 22 and the cooling passage 1c. According to this configuration, the flow path switching device capable of performing the cooling mode flow path during the cooling operation and the heating mode flow path during the heating operation can be provided by three on-off valves.

The first valve 24 has a configuration in which it is operated to become the closed state when an ambient pressure of the first valve 24 is higher than a predetermined first pressure threshold value and a configuration in which it becomes the open state when the ambient pressure of the first valve 24 is lower than a predetermined second pressure threshold value. The second valve 25 has a configuration in which it is operated to become the closed state when an ambient pressure of the second valve 25 is higher than a first pressure threshold value and a configuration in which it becomes the open state when the ambient pressure is lower than a second pressure threshold value. The third valve 26 has a configuration in which it is operated to become the open state when an ambient pressure of the third valve 26 is higher than a first pressure threshold value and a configuration in which it becomes the closed state when the ambient pressure is lower than a second pressure threshold value. According to this, it is possible to provide the flow path switching device including a mechanical unit which implements the cooling mode flow path during the cooling operation in which the refrigerant becomes the high pressure and the heating mode flow path during the heating operation in which the refrigerant becomes the low pressure.

The first valve 24 has a configuration in which it is operated to become the closed state when an ambient temperature is higher than a predetermined first temperature threshold value, and a configuration in which it becomes the open state when the ambient temperature is lower than a predetermined second temperature threshold value. The second valve 25 has a configuration in which it is operated to become the closed state when the ambient temperature is higher than a first temperature threshold value and a configuration in which it is operated to become the open state when the ambient temperature is lower than the second temperature threshold value. The third valve 26 has a configuration in which it is operated to become the open state when the ambient temperature is higher than a first temperature threshold value and a configuration in which it is operated to become the closed state when the ambient temperature is lower than the second temperature threshold value. According to this, it is possible to provide the flow path switching device including a mechanical unit which implements the cooling mode flow path during the cooling operation in which an ambient temperature becomes high and the heating mode flow path during the heating operation in which the ambient temperature becomes low.

Second Embodiment

Figure 5:
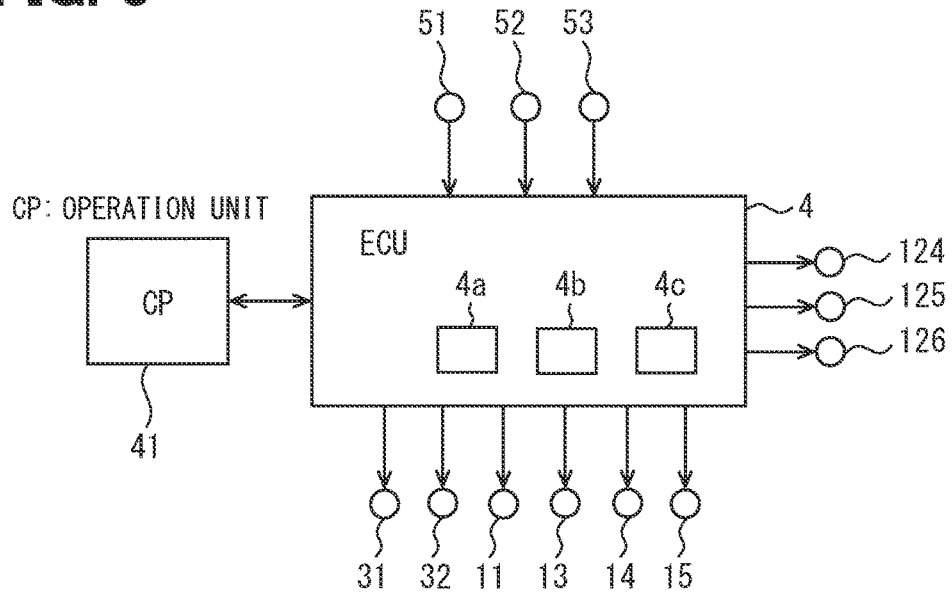
FIG. 5 is a control configuration diagram of a vehicle air-conditioner of a second embodiment.
Figure 6:
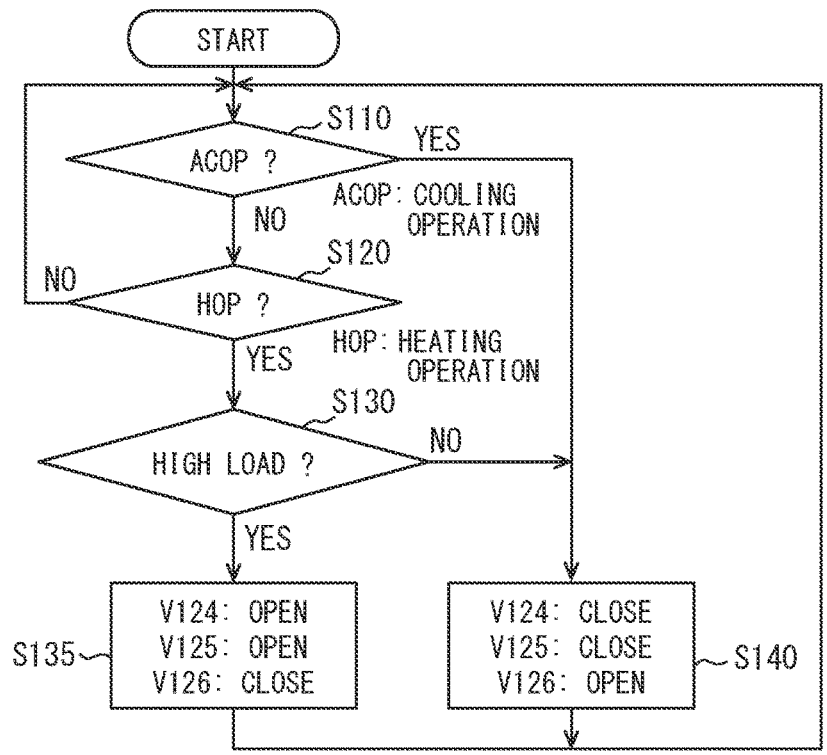
FIG. 6 is a flowchart showing control of the second embodiment.

A second embodiment will be described with reference to FIGS. 5 and 6. A description, operation and effect which are not explained in the second embodiment are the same as those of the first embodiment, and different points from those of the above mentioned embodiment are mainly described hereafter. FIG. 5 shows a configuration relating to control of the vehicle air conditioner according to the second embodiment. The flowchart of FIG. 6 shows a control process relating to the operation of the flow path switching device.

The second embodiment differs from the first embodiment in that operations of the first valve 124, the second valve 125, and the third valve 126 are controlled by the control device 4, as shown in FIG. 5. The control device 4 controls the first valve 124 to the closed state, controls the second valve 125 to the closed state, and controls the third valve 126 to the open state during the cooling operation. The control device 4 controls the first valve 124 to the open state, controls the second valve 125 to the open state, and controls the third valve 126 to the closed state during the heating operation.

When an automatic air conditioning operation command is input to the control device 4 by an operation of the operation unit 41, the control device 4 starts the automatic air conditioning operation. The control device 4 starts the control program stored in the memory of the storage unit 4c to initialize the data stored in the RAM and the like. The control device 4 inputs each data such as setting conditions and current air conditioning environment conditions by inputting signals from the operation unit 41, various sensors, and the like. The arithmetic processing unit 4b calculates the target outlet temperature TAO using a program stored in the storage unit 4c or the like, and calculates the blower level of the blower 31.

The control device 4 determines whether or not the cooling operation is set in step S110. In step S110, it is determined whether or not the cooling operation is set in the automatic air conditioning operation or a manual air conditioning operation. This determination includes a case where the cooling operation is set by the arithmetic processing unit 4b when there is the automatic air conditioning operation command, and a case where the cooling operation is set by the input by the operation unit 41.

If it is determined in step S110 that the cooling operation is set, the control device 4 executes a process of step S140. The control device 4 controls the first valve 124, the second valve 125, and the third valve 126 to the closed state, the closed state, and the open state, respectively. By this process, as described above, the U-turn-shaped refrigerant flow path shown in FIG. 3 can be implemented in the outdoor heat exchanger 2 to improve the capacity during the cooling operation. After executing the process of step S140, the air conditioning operation is continued by returning to step S110 and repeating the subsequent processes.

If it is determined in step S110 that the cooling operation is not set, the control device 4 determines whether or not the heating operation is set in step S120. This determination includes a case where the cooling operation is set by the arithmetic processing unit 4b when there is the automatic air conditioning operation command, and a case where the cooling operation is set by the input by the operation unit 41.

If it is determined in step S120 that the heating operation is set, the control device 4 executes a process of step S130. The arithmetic processing unit 4b determines in step S130 whether or not the high load condition is satisfied. In step S130, it is determined that the high load condition is satisfied when a refrigerant flow rate during the heating operation is included within the predetermined high flow rate range. The predetermined high flow rate region may be data stored in advance in the storage unit 4c or data inputted to the program. The arithmetic processing unit 4b acquires a refrigerant flow rate by using, for example, a discharge pressure of the compressor 11, a discharge flow rate, or information of a detected value of a flow rate sensor, and determines in step S130. If it is determined in step S120 that the heating operation is not set, the process returns to step S110 again.

In step S130, when the refrigerant flow rate is a low flow rate which is not included within the high flow rate region, it is determined that the high load condition is not satisfied. In this case, since the pressure loss in the flow path is not large, the flow path is set to improve the refrigerant distribution in the outdoor heat exchanger 2. That is, the control device 4 executes a process of step S140 described above to perform the heating operation in which the outdoor heat exchanger 2 implements a U-turn-shaped refrigerant flow path. By this process, it is possible to improve the heating capacity by improving the refrigerant distribution during the heating operation.

If it is determined in step S130 that the high load condition is satisfied, the control device 4 executes process of step S135. The control device 4 controls the first valve 124, the second valve 125, and the third valve 126 to the closed state, the closed state, and the open state, respectively. By this process, in order to secure the refrigerant flow rate, it is possible to implement an all path refrigerant flow path shown in FIG. 4 in the outdoor heat exchanger 2 to improve the capacity during the heating operation. After executing the process of step S135, the air conditioning operation is continued by returning to step S110 and repeating the subsequent processes.

According to the second embodiment, the control device 4 controls the first valve 124 and the second valve 125 to the closed state and controls the third valve 126 to the open state during the cooling operation. The control device 4 controls the first valve 124 and the second valve 125 to the open state and controls the third valve 126 to the closed state during the heating operation. According to this, it is possible to provide switching control of three valves capable of reliably executing the cooling mode flow path during the cooling operation and the heating mode flow path during the heating operation.

The control device 4 controls the first valve 124 and the second valve 125 to the open state and controls the third valve 126 to the closed state when the refrigerant flow rate is included within the predetermined high flow rate region during the heating operation. The control device 4 controls the first valve 124 and the second valve 125 to the closed state and controls the third valve 126 to the open state when the refrigerant flow rate is the predetermined low flow rate region during the heating operation. According to this, since the pressure loss is small during the heating operation and when the flow rate of the refrigerant is low, the refrigerant flow path for improving the refrigerant distribution is implemented. Therefore, it is possible to provide a control which improves a heating capacity by improving a refrigerant distribution by forming the U-turn flow path instead of the all path flow path, is finer, and can improve a temperature control capacity.

Third Embodiment

The third embodiment is described with reference to FIGS. 7 to 10. A configuration, operation and effect which are not explained in the third embodiment are the same as those of the above-mentioned embodiment, and different points from those of the above-mentioned embodiment are mainly described hereafter. In the flowchart of FIG. 10, the descriptions of the second embodiment are referenced for steps indicated by the same reference numerals as in the flowchart of FIG. 6 described above.

Figure 7:
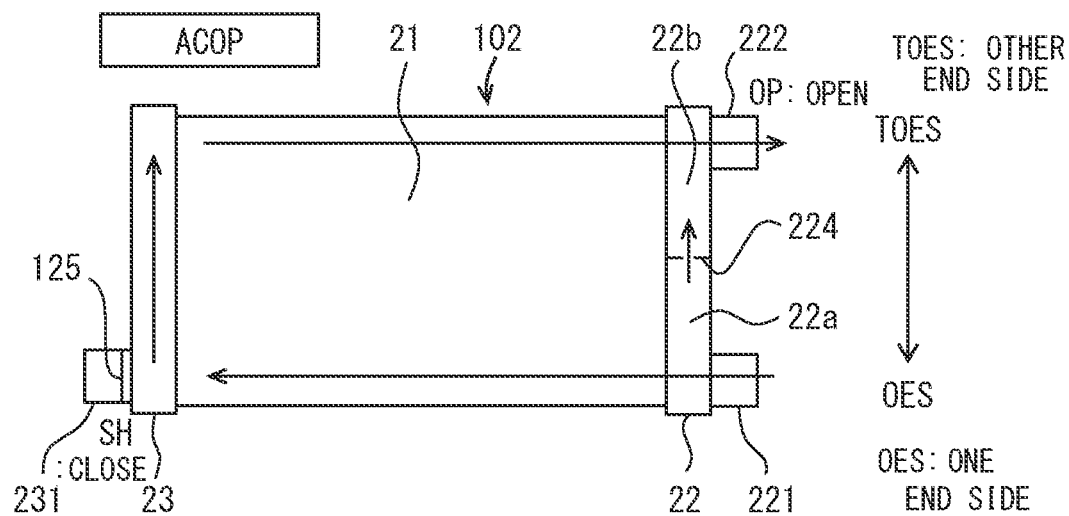
FIG. 7 is a schematic view showing a refrigerant flow during a cooling operation in a variable flow path heat exchanger of a third embodiment.
Figure 8:
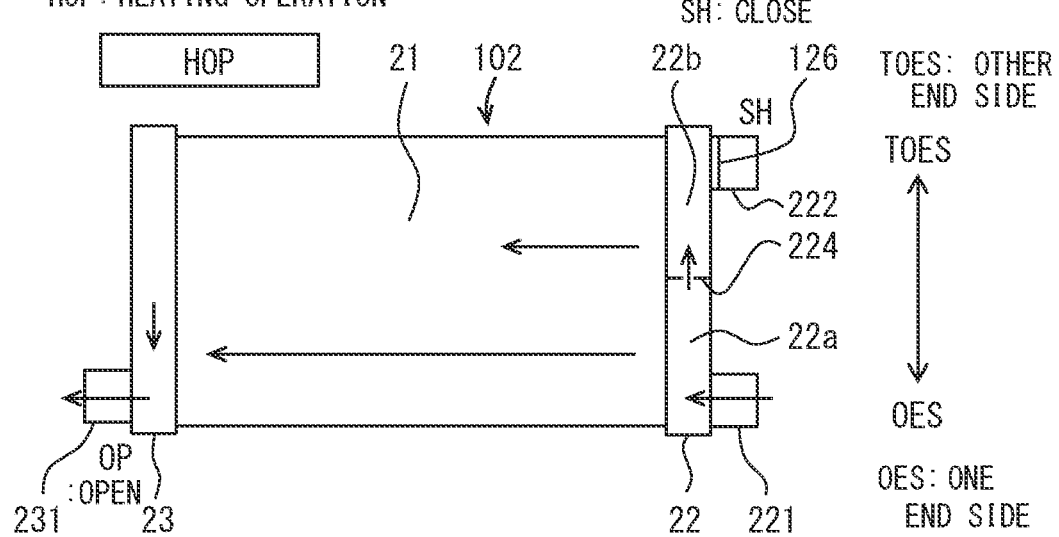
FIG. 8 is a schematic view showing a refrigerant flow during a heating operation in the variable flow path heat exchanger.

The third embodiment is different from the second embodiment in the configuration of the flow path switching device in the outdoor heat exchanger 102 and in a control process related to an operation of the flow path switching device. The refrigeration cycle device of the third embodiment does not include the first valve 24, but includes a second valve 125 and a third valve 126 as the flow path switching device. FIG. 7 shows a relationship between the refrigerant flow and the flow path switching device during the cooling operation of the outdoor heat exchanger 102. FIG. 8 shows a relationship between the refrigerant flow and the flow path switching device during the heating operation of the outdoor heat exchanger 102.

The second valve 125 is a heating valve which opens and closes to provide a communicating state and a shutoff state between an inside of the second tank portion 23 and the heating passage 1b. The third valve 126 is a cooling valve which opens and closes to provide a communicating state and a shutoff state between an inside of the first tank portion 22 and the cooling passage 1c.

As shown in FIGS. 7 and 8, the outdoor heat exchanger 102 includes a fixed orifice portion 224 or a partition portion provided in the first tank portion 22. The partition portion is a wall portion which partitions the inside of the first tank portion 22 into one end side chamber 22a and the other end side chamber 22b. The fixed orifice portion 224 forms an orifice passage through which a small amount of refrigerant can flow between one end side chamber 22a and the other end side chamber 22b. The orifice passage constitutes a cross-sectional area sufficiently smaller than a cross-sectional area in a cross section orthogonal to a longitudinal direction in the first tank portion 22.

During the cooling operation, the refrigerant flows in the outdoor heat exchanger 102 in a U-turn-shaped cooling mode flow path in which the refrigerant flows in one direction and then flows down in the opposite direction in the heat exchange core portion 21. During the heating operation, the refrigerant flows in the outdoor heat exchanger 102 in the heating mode flow path in which the refrigerant flows down in one direction from the first tank portion 22 to the second tank portion 23. In the case that the fixed orifice portion 224 is provided, a small amount of refrigerant flows through the other end side flow path during the heating operation shown in FIG. 8 in the heat exchange core portion 21, and most of the refrigerant flows down the one end side flow path. In the case that the partition portion is provided, the refrigerant flowing into the first tank portion 22 flows into the second tank portion 23 from the one end side chamber 22a via the one end side flow path only.

Figure 9:
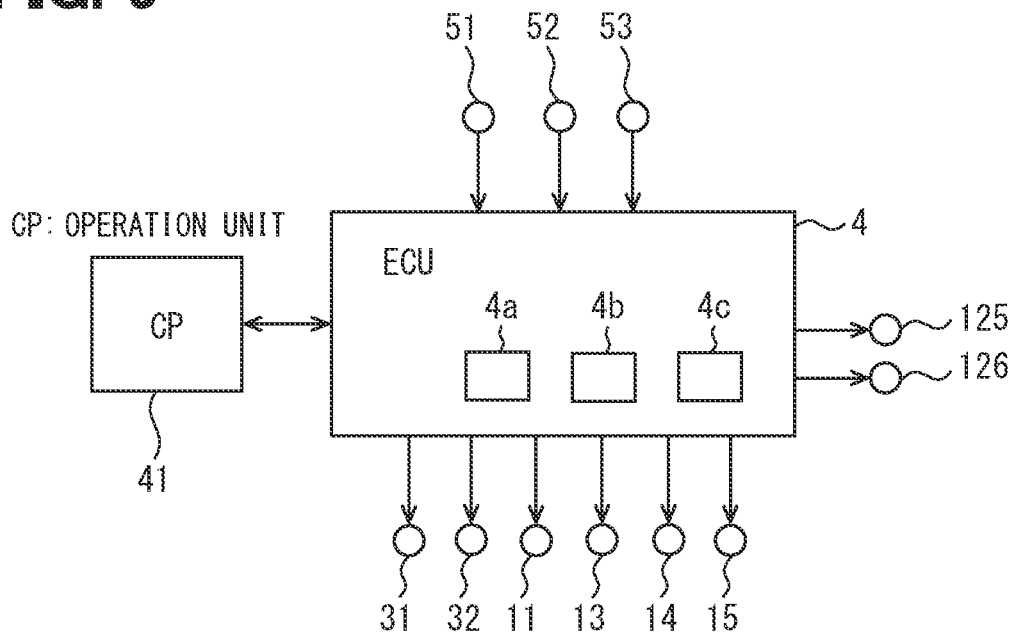
FIG. 9 is a control configuration diagram of a vehicle air-conditioner of the third embodiment.
Figure 10:
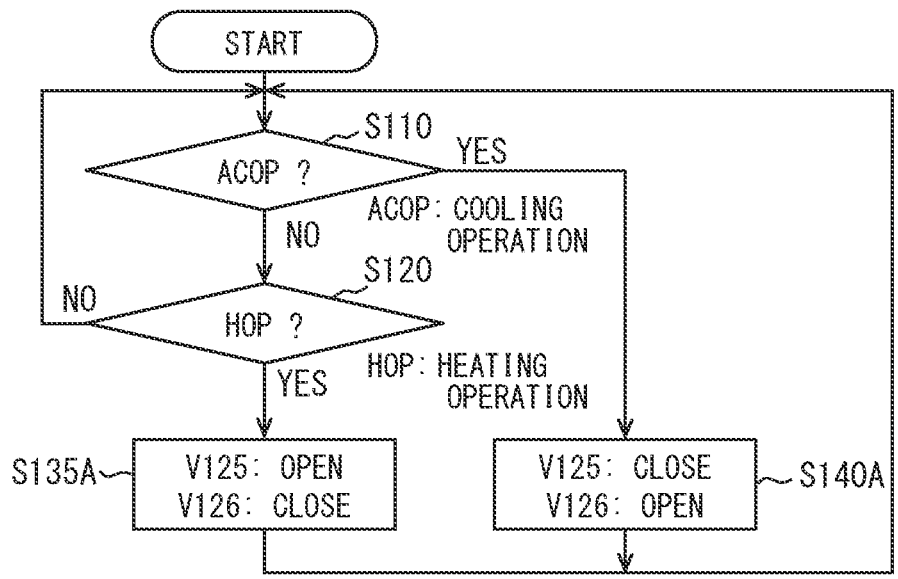
FIG. 10 is a flowchart showing control of the third embodiment.

FIG. 9 shows a configuration relating to control of the vehicle air conditioner according to the third embodiment. The flowchart of FIG. 10 shows a control process relating to the operation of the flow path switching device of the third embodiment. The flowchart of FIG. 10 is described below.

If it is determined in step S110 that the cooling operation is set, the control device 4 executes a process of step S140. The control device 4 controls the second valve 125 and the third valve 126 to the closed state and the open state, respectively. By this process, as described above, the U-turn-shaped refrigerant flow path shown in FIG. 7 can be implemented in the outdoor heat exchanger 102 to improve the capacity during the cooling operation. After executing the process of step S140A, the air conditioning operation is continued by returning to step S110 and repeating the subsequent processes.

If it is determined in step S120 that the heating operation is set, the control device 4 executes a process of step S135A. The control device 4 controls the second valve 125 and the third valve 126 to the closed state and the open state, respectively. By this process, in order to secure the refrigerant flow rate, it is possible to implement the all path refrigerant flow path shown in FIG. 8 in the outdoor heat exchanger 102 to improve the capacity during the heating operation. After executing the process of step S135A, the air conditioning operation is continued by returning to step S110 and repeating the subsequent processes.

According to the third embodiment, the flow path switching device includes the heating valve which opens and closes to provide the communicating state and the shutoff state between the inside of the second tank portion 23 and the heating passage 1b, and the cooling valve which opens and closes to provide the communicating state and the shutoff state between the inside of the first tank portion 22 and the cooling passage 1c. According to this configuration, the flow path switching device capable of performing the cooling mode flow path during the cooling operation and the heating mode flow path during the heating operation can be provided by two on-off valves.

The control device 4 controls the heating valve to the closed state and the cooling valve to the open state during the cooling operation. The control device 4 controls the heating valve to the open state and the cooling valve to the closed state during the heating operation. According to this, it is possible to provide the switching control of two valves capable of reliably executing the cooling mode flow path during the cooling operation and the heating mode flow path during the heating operation.

OTHER EMBODIMENTS

The disclosure in the present specification is not limited to the illustrated embodiments. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses the omission of parts and elements of the embodiments. The disclosure encompasses the replacement or combination of components, elements between one embodiment and another. The disclosed technical scope is not limited to the description of the embodiment. Technical scopes disclosed are indicated by descriptions in the claims and should be understood to include all modifications within the meaning and scope equivalent to the descriptions in the claims.

A refrigeration cycle device capable of achieving the object disclosed in this specification includes a heat exchanger in which heat exchange is performed between a temperature-controlled object and the refrigerant flowing inside. The temperature control object is not limited to air, water, etc. described in the above-described embodiment. For example, the temperature control object is a battery, a power conversion device, a switching element, a semiconductor device, a housing for accommodating them, a heat sink, and the like.

A refrigeration cycle device capable of achieving the object disclosed in the specification has the cooling mode flow path including a flow path in which the refrigerant flows in one direction and then flows down in the opposite direction in the heat exchange core portion. This cooling mode flow path includes not only a flow path configuration in which the refrigerant flow path in the heat exchange core portion makes a U-turn in a U-shape, but also a flow path configuration in which the refrigerant flow path makes an S-shape in an S-shape.

The refrigeration cycle apparatus capable of achieving the object disclosed in the specification is not limited to the configuration described in the above-described embodiment. This refrigeration cycle device may be two separate heat exchangers arrangement or one heat exchanger arrangement for the cooling heat exchanger and the heating heat exchanger. This refrigeration cycle device may be implemented to switch one heat exchanger into a cooling heat exchanger and a heating heat exchanger by employing a flow path switchable configuration.

The flow path switching device in the third embodiment described above is not limited to the configuration controlled by the control device 4. The flow path switching device of the third embodiment may have a mechanical configuration based on a pressure-operated type or a mechanical configuration based on a temperature-operated type, like the flow path switching device of the first embodiment.

What is claimed is:

1. A refrigeration cycle device, comprising:
   a refrigerant circuit through which a refrigerant circulates;
   a cooling heat exchanger which is installed in the refrigerant circuit, and performs a heat exchange between the refrigerant flowing inside and an object to be cooled during a cooling operation for cooling the object to be cooled;
   a heating heat exchanger which is installed in the refrigerant circuit and performs a heat exchange between the refrigerant flowing inside and an object to be heated during a heating operation for heating the object to be heated;
   a variable flow path heat exchanger which is installed in the refrigerant circuit, and has a heat exchange core portion providing refrigerant flow paths different in the cooling operation and the heating operation; and
   a flow path switching device which switches the flow paths of the refrigerant in the heat exchange core portion of the variable flow path heat exchanger between a cooling mode flow path during the cooling operation and a heating mode flow path during the heating operation, wherein
   the heating mode flow path is a flow path through which the refrigerant flows down in one direction in the heat exchange core portion, and wherein
   the cooling mode flow path is a flow path through which the refrigerant flows in one direction and then flows down in an opposite direction in the heat exchange core portion, and wherein
   the variable flow path heat exchanger includes a first tank portion and a second tank portion which are provided at both ends of the heat exchange core portion to communicate with the heat exchange core portion, and wherein
   the refrigerant circuit includes:
   a cooling passage which connects a passage communicating with a suction portion of a compressor and the first tank portion via the cooling heat exchanger; and
   a heating passage which connects the passage communicating with the suction portion of the compressor and the second tank portion without passing through the cooling heat exchanger, and wherein
   the flow path switching device includes:
   a first valve which opens and closes a passage inside the first tank portion;
   a second valve which opens and closes in a communicating state and a shut off state between an inside of the second tank portion and the heating passage; and
   a third valve which opens and closes to provide a communicating state and a shut off state between an inside of the first tank portion and the cooling passage.

2. The refrigeration cycle device according to claim 1, further comprising:
   a control device which controls operation of the first valve, the second valve, and the third valve, wherein
   the control device controls the first valve and the second valve to a closed state and controls the third valve to an open state during the cooling operation, and controls the first valve and the second valve to an open state and controls the third valve to a closed state during the heating operation.

3. The refrigeration cycle device according to claim 2, wherein
   the control device controls the first valve and the second valve to an open state and controls the third valve to a closed state when a refrigerant flow rate is within a predetermined high flow rate region during the heating operation, and controls the first valve and the second valve to a closed state and controls the third valve to an open state when a refrigerant flow rate is a low flow rate which is not within the predetermined high flow rate region during the heating operation.

4. The refrigeration cycle device according to claim 1, wherein
   the first valve has a configuration in which it is operated to become a closed state when an ambient pressure of the first valve is higher than a predetermined first pressure threshold value, and a configuration in which it becomes an open state when the ambient pressure of the first valve is lower than a predetermined second pressure threshold value which is set lower than the first pressure threshold value, and wherein
   the second valve has a configuration in which it is operated to become a closed state when an ambient pressure of the second valve is higher than the first pressure threshold value, and a configuration in which it is operated to become an open state when the ambient pressure of the second valve is lower than the second pressure threshold value, and wherein the third valve has a configuration in which it is operated to become an open state when an ambient pressure of the third valve is higher than the first pressure threshold value, and a configuration in which it is operated to become a closed state when an ambient pressure of the third valve is lower than the second pressure threshold value.

5. The refrigeration cycle device according to claim 1, wherein the first valve has a configuration in which it is operated to become a closed state when an ambient temperature is higher than a predetermined first temperature threshold value, and a configuration in which it becomes an open state when the ambient temperature is lower than a predetermined second temperature threshold value which is set lower than the first temperature threshold value, and wherein the second valve has a configuration in which it is operated to become a closed state when an ambient temperature is higher than the first temperature threshold value, and a configuration in which it is operated to become an open state when the ambient temperature is lower than the second temperature threshold value, and wherein the third valve has a configuration in which it is operated to become an open state when an ambient temperature is higher than the first temperature threshold value, and a configuration in which it is operated to become a closed state when an ambient temperature is lower than the second temperature threshold value.

6. A refrigeration cycle device, comprising:

a refrigerant circuit through which a refrigerant circulates;

a cooling heat exchanger which is installed in the refrigerant circuit, and performs a heat exchange between the refrigerant flowing inside and an object to be cooled during a cooling operation for cooling the object to be cooled;

a heating heat exchanger which is installed in the refrigerant circuit and performs a heat exchange between the refrigerant flowing inside and an object to be heated during a heating operation for heating the object to be heated;

a variable flow path heat exchanger which is installed in the refrigerant circuit, and has a heat exchange core portion providing refrigerant flow paths different in the cooling operation and the heating operation; and a flow path switching device which switches the flow paths of the refrigerant in the heat exchange core portion of the variable flow path heat exchanger between a cooling mode flow path during the cooling operation and a heating mode flow path during the heating operation, wherein the heating mode flow path is a flow path through which the refrigerant flows down in one direction in the heat exchange core portion, and wherein the cooling mode flow path is a flow path through which the refrigerant flows in one direction and then flows down in an opposite direction in the heat exchange core portion, and wherein the variable flow path heat exchanger includes:

the heat exchange core portion; and a first tank portion and a second tank portion which are provided at both ends of the heat exchange core portion to communicate with the heat exchange core portion, and wherein the refrigerant circuit includes:

a cooling passage which connects a passage communicating with a suction portion of a compressor and the first tank portion via the cooling heat exchanger; and a heating passage which connects the passage communicating with the suction portion of the compressor and the second tank portion without passing through the cooling heat exchanger, and wherein the flow path switching device includes:

a heating valve which opens and closes to provide a communicating state and a shut off state between an inside of the second tank portion and the heating passage; and a cooling valve which opens and closes to provide a communicating state and a shut off state between an inside of the first tank portion and the cooling passage.

7. The refrigeration cycle device according to claim 6, further comprising:

a control device which controls operation of the heating valve and the cooling valve, wherein the control device controls the heating valve to a closed state and controls the cooling valve to an open state during the cooling operation, and controls the heating valve to an open state and controls the cooling valve to a closed state during the heating operation.

* * * * *